US009166753B2

(12) United States Patent
Kim et al.

(10) Patent No.: US 9,166,753 B2
(45) Date of Patent: Oct. 20, 2015

(54) METHOD FOR PROVIDING CONTROL INFORMATION ASSOCIATED WITH FRACTIONAL FREQUENCY REUSE

(75) Inventors: Su Nam Kim, Gyeonggi-do (KR); Jae Wan Kim, Gyeonggi-do (KR); Han Gyu Cho, Gyeonggi-do (KR); Bin Chul Ihm, Gyeonggi-do (KR); Dong Guk Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 13/003,094

(22) PCT Filed: Jun. 16, 2009

(86) PCT No.: PCT/KR2009/003221
§ 371 (c)(1),
(2), (4) Date: Mar. 16, 2011

(87) PCT Pub. No.: WO2010/005182
PCT Pub. Date: Jan. 14, 2010

(65) Prior Publication Data
US 2011/0195732 A1    Aug. 11, 2011

Related U.S. Application Data

(60) Provisional application No. 61/078,759, filed on Jul. 7, 2008.

(30) Foreign Application Priority Data

Oct. 31, 2008 (KR) ........................ 10-2008-0107608

(51) Int. Cl.
*H04W 40/00* (2009.01)
*H04W 72/00* (2009.01)
*H04B 15/00* (2006.01)
(Continued)

(52) U.S. Cl.
CPC ............. *H04L 5/0037* (2013.01); *H04W 16/02* (2013.01); *H04L 5/0007* (2013.01)

(58) Field of Classification Search
CPC .............................. H04W 16/12; H04W 16/02
USPC .......................................................... 455/447
See application file for complete search history.

(56) References Cited

U.S. PATENT DOCUMENTS 6,490,298 B1 * 12/2002 Chin et al. ..................... 370/532
2004/0092256 A1 * 5/2004 Keller et al. ............... 455/422.1
(Continued)

FOREIGN PATENT DOCUMENTS

| WO | 2008/053429 A1 | 5/2008 |
| WO | WO2008/055132 A2 | 5/2008 |
| WO | WO2008/057971 A2 | 5/2008 |

*Primary Examiner* — Lester Kincaid
*Assistant Examiner* — Andy Gu
(74) *Attorney, Agent, or Firm* — Morgan, Lewis & Bockius LLP

(57) ABSTRACT

The present invention relates to a method for providing control information in a mobile communication system. More specifically, the invention relates to a method for providing control information through a network in mobile communication. The method comprises: a step for configuring the information associated with plural frequency resource groups and the power levels thereof in the control information of preset data format, wherein the plural frequency resource groups are for application of FFR (Fractional Frequency Reuse), and a step for transmitting the control information to at least one terminal.

16 Claims, 3 Drawing Sheets

CELL-EDGE USER :

INNER USER :

(51) Int. Cl.
 *H04L 5/00* (2006.01)
 *H04W 16/02* (2009.01)

(56) References Cited

U.S. PATENT DOCUMENTS

| | | | |
|---|---|---|---|
| 2006/0189321 A1* | 8/2006 | Oh et al. | 455/452.2 |
| 2006/0234715 A1* | 10/2006 | Cho et al. | 455/447 |
| 2007/0242763 A1* | 10/2007 | Li et al. | 375/260 |
| 2008/0232320 A1* | 9/2008 | Lee et al. | 370/329 |
| 2008/0298477 A1* | 12/2008 | Classon | 375/260 |
| 2008/0316950 A1* | 12/2008 | Damnjanovic | 370/311 |
| 2010/0027502 A1* | 2/2010 | Chen et al. | 370/330 |
| 2010/0061297 A1* | 3/2010 | Wei et al. | 370/328 |
| 2010/0105406 A1 | 4/2010 | Luo et al. | |
| 2011/0092242 A1* | 4/2011 | Parkvall et al. | 455/509 |

* cited by examiner

CELL-EDGE USER :

INNER USER :

Fig. 4

| 410 | 420 | 430 | 440 | 451 | 452 |
|---|---|---|---|---|---|
| GROUP COUNT | POWER LEVEL | SECTOR TYPE | CONFIGURAITON RATIO OF GROUPS | FFR METHOD 1 (FREQUENCY REUSE RATIO 1) | FFR METHOD 2 (FREQUENCY REUSE RATIO 2) |

Fig. 5

| 520 | 530 | 540 | 550 |
|---|---|---|---|
| POWER LEVEL | SECTOR TYPE | CONFIGURAITON RATIO OF GROUPS | FFR METHOD (FREQUENCY REUSE RATIO) |

METHOD FOR PROVIDING CONTROL INFORMATION ASSOCIATED WITH FRACTIONAL FREQUENCY REUSE

The present application is a national stage of PCT International Application No. PCT/KR2009/003221, filed Jun. 16, 2009, and claims the benefit of U.S. Provisional Application No. 61/078,759, filed Jul. 7, 2008. The present national stage application also claims the benefit of Korean Patent Application No. 10-2008-0107608, filed Oct. 31, 2008.

TECHNICAL FIELD

The present invention relates to a mobile communication system, and more particularly, to a method for providing control information associated with fractional frequency reuse in a multi-cellular structure.

BACKGROUND ART

Frequency reuse is one of methods for increasing the number of channels per a unit area in a cellular system. Because a radio wave gets weaker with distance, radio waves interfere less with each other in places apart from each other by a specific distance and thus the same frequency channel can be used in the places. Use of the same frequency in a plurality of areas based on this principle may lead to a great increase in subscriber capacity. The efficient frequency utilization is called frequency reuse. An identifiable geographical unit is called a cell (mobile communication cell) and frequency channel switching between cells for seamless communication is called handoff. In an analog cellular communication scheme, frequency reuse is essential. A frequency reuse ratio is one of parameters representing frequency efficiency in a cellular system. The frequency reuse ratio is calculated by dividing the total number of cells (sectors) using the same frequency by the total number of cells (sectors) in a multi-cell structure.

A 1G system (e.g. AMPS) has a frequency reuse ratio less than 1. For instance, in a 7-cell frequency reuse scheme, the frequency reuse ratio is 1/7. Compared to the 1G system, a 2G system (e.g. CDMA and TDMA) has an improved frequency reuse ratio. For instance, the frequency reuse ratio may reach 1/4 or 1/3 in GSM being a combination of FDMA and TDMA. In 2G CDMA and 3G WCDMA systems, the frequency reuse ratio may reach 1, thus increasing spectral efficiency and reducing network deployment cost.

When all sectors of one cell and all sells of one network use the same frequency, a frequency reuse ratio of 1 can be achieved. However, the frequency reuse ratio of 1 in a cellular network means that users at a cell edge have degraded signal reception performance due to interference from a neighbor cell.

In OFDMA, a channel is divided into subchannels and thus a signal is transmitted on a subchannel, without using the entire channel as is done in 3G (CDMA2000 or WCDMA). This feature of OFDMA may simultaneously improve the throughputs of users at the center of a cell and users at the boundary of the cell (the edge of the cell). Specifically, the cell center is near to a BS and thus safe from co-channel interference of a neighbor cell. Accordingly, inner users at the cell center may use all available subchannels. However, cell-edge users may use only a part of all available subchannels. Frequencies are allocated to users at the boundary between adjacent cells such that each cell may use a different subchannel. This scheme is called FFR (fractional frequency reuse).

DISCLOSURE

Technical Problem

To apply FFR, each BS uses a different frequency band on a subchannel. For example, some tones are used in all sectors, with a frequency reuse ratio of 1, whereas other tones are used at a ratio of 1/3 in each sector, with a frequency reuse ratio of 1/3. Various frequency reuse ratios may be set depending on network configurations. FFR methods are classified into hard FFR and soft FFR. Some tones are not used at all in hard FFR, while some tones are used at a low power level in soft FFR. In this manner, many FFT settings are possible. Thus control information about an FFR configuration should be shared between BSs and/or terminals in order to effectively use FFR in real applications.

An object of the present invention devised to solve the conventional problem is to provide a method for efficiently using FFR in a multi-cellular mobile communication system.

Another object of the present invention is to provide a method for providing information about an FFR configuration to a BS and/or a terminal in a mobile communication system.

A further object of the present invention is to provide a data format for efficiently providing information about an FFR configuration.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting control information by a network in a mobile communication system includes configuring control information of a preset data format with information about a plurality of frequency resource groups for application of FFR (fractional frequency reuse) and information about power levels of the frequency resource groups, and transmitting the control information to at least one terminal.

In another aspect of the present invention, a method for receiving control information by a terminal in a multi-cellular mobile communication system includes receiving control information of a preset data format including information about a plurality of frequency resource groups for application of FFR and information about power levels of the frequency resource groups, and acquiring information needed to apply FFR from the control information using the preset data format.

Advantageous Effects

Embodiments of the present invention have the following effects.

Firstly, FFR can be efficiently used in a mobile communication system.

Secondly, information about an FFR configuration can be provided to a BS and/or a terminal.

Thirdly, a data format for efficiently carrying information about an FFR configuration can be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 illustrates an example in which control information associated with FFR is configured in the form of a message according to an embodiment of the present invention.

FIG. 5 illustrates an example in which control information associated with FFR is configured in the form of a message according to another embodiment of the present invention.

BEST MODE FOR CARRYING OUT THE INVENTION

The configuration, operation, and other features of the invention will become apparent to those having ordinary skill in the art upon examination of the following embodiments of the present invention described with reference to the attached drawings. The embodiments of the present invention as set forth herein are examples in which the technical features of the present invention are applied to a multi-cellular mobile communication system.

Figure 1:
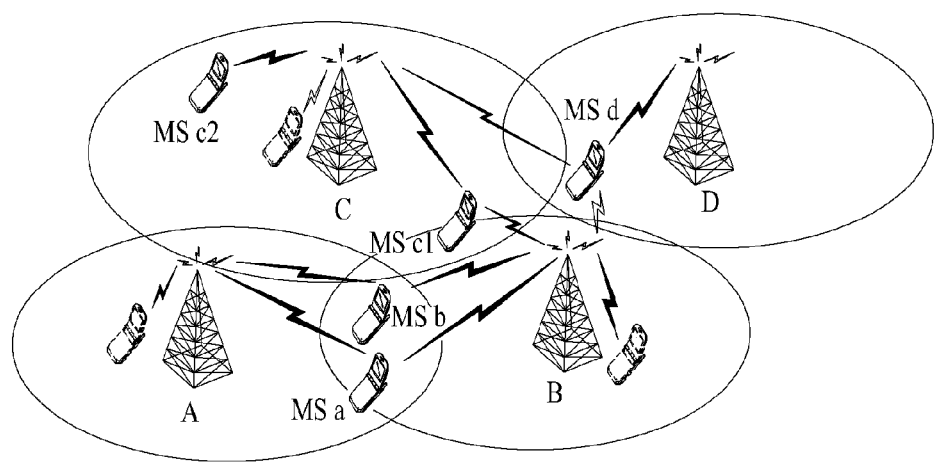
FIG. 1 illustrates an example in which a specific terminal receives a service from at least one BS according to the location of the terminal within a cell in a multi-cellular environment.
Figure 1:
Figure 1:

FIG. 1 illustrates an example in which a specific terminal receives a service from at least one BS according to the location of the terminal within a cell in a multi-cellular environment.

Referring to FIG. 1, MS a is located at the edge of Cell A and receives a service from Cell A. However, because MS a also belongs to the edge of Cell B, it may be affected by Cell B. Similarly, MS b is located at the edge of Cell B and receives a service from Cell B. However, because MS b also belongs to the edge of Cell A, it may be affected by Cell A. While MS c1 is at the edge of Cell C and receives a service from Cell C, it also belongs to the edge of Cell B and thus may be affected by Cell B. Although MS c2 is at the edge of Cell C and receives a service from Cell C, it may be affected by another neighbor cell which is not shown, because it also belongs to the neighbor cell. MS d is located at the edge of Cell D and thus receives a service from Cell D. However, because MS d is also at the edges of Cell B and Cell C, it may be affected by Cell B and Cell C.

That is, each of MS a, MS b, MS c1, MS c2 and MS d is located at the boundary between at least two cells and thus simultaneously affected by the neighbor cells. Therefore, the terminals may experience a decrease in the throughput of received service data due to co-channel interference caused by the neighbor cells. On the other hand, inner users illustrated in FIG. 1 are not affected by the neighbor cells.

Figure 2:
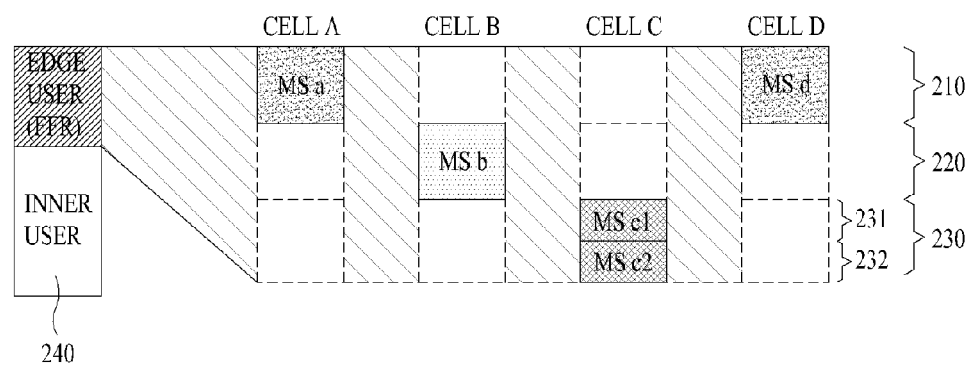
FIG. 2 illustrates an exemplary frequency resource allocation in hard FFR.

FIG. 2 illustrates an exemplary Hard FFR configuration based on a plurality of cells and a plurality of terminals illustrated in FIG. 1, to which an embodiment of the present invention is applicable.

Referring to FIG. 2, total frequency resources available to a cell may be divided/classified according to various criteria related to application of FFR. First of all, total frequency resources (or a total frequency band) available to each cell may be divided largely into two areas. One area is frequency resources for edge users (edge terminals) located at the boundary between adjacent cells and the other area is frequency resources for inner users (inner terminals) within a cell (240).

According to FFR methods, the frequency area for edge users may be further branched into a plurality of smaller areas. FIG. 2 illustrates an exemplary FFR 1/3 scheme (that is, a frequency reuse ratio associated with FFR is 1/3). In case of FFR 1/3, the frequency resources for edge users are divided into three areas 210, 220 and 230. Each cell services edge users using only one of the three areas. Herein, the areas are referred to as frequency resource groups and the terms are interchangeably used.

The frequency resource groups may also be classified according to FFR-related usages. In FIG. 2, total frequency resource groups available to a cell may be divided into three frequency bands according to FFR-related usages. A first frequency band is a frequency resource group actually used for edge users in the corresponding cell among the frequency resource groups for edge users, referred to as "FFR_band_edge" and a second frequency band is a frequency resource group unused for the edge users in the corresponding cell among the frequency resource groups for edge users, referred to as "FFR_band_inner". A third frequency band is a frequency resource group for inner users, referred to as "inner_band". For Cell A, reference numeral 210 denotes FFR_band_edge, reference numerals 220 and 230 denote FFR_band_inner, and reference numeral 240 denotes inner_ band.

In the example of FIG. 2, each cell uses only 1/3 of frequency resources allocated to edge users and thus the frequency reuse ratio is 1/3 for the cell-edge users. On the other hand, because each cell uses all frequency resources allocated to inner users, the frequency resource ratio is 1 for the inner users. Hereinafter, the frequency resource ratio for edge users is referred to as an 'FFR ratio'. For instance, if the FFR ratio is 2/3, three frequency resource groups are allocated to edge users and each cell services edge users using only two of the frequency resource groups.

Referring to FIG. 2 again, FFR implementation using allocated frequency resource groups in case of FFR 1/3 will be described in detail.

Cell A is partially overlapped with Cell B and Cell C in FIG. 1. Therefore, the specific frequency resources 210 allocated to Cell A may not be used in Cell B and Cell C, as illustrated in FIG. 2. Similarly, since Cell B is partially overlapped with Cell A, Cell C and Cell D in FIG. 1, the specific frequency resources 220 allocated to Cell B may not be used in Cell A, Cell C and Cell D as illustrated in FIG. 2. Similarly, Cell C is partially overlapped with Cell A, Cell B and Cell D in FIG. 1, the specific frequency resources 230 allocated to Cell C may not be used in Cell A, Cell B and Cell D as illustrated in FIG. 2. Similarly, Cell D is partially overlapped with Cell B and Cell C in FIG. 1, the specific frequency resources 210 allocated to Cell D may not be used in Cell B and Cell C as illustrated in FIG. 2. Since Cell A is not overlapped with Cell D in FIG. 1, the same frequency resources 210 can be allocated to Cell A and Cell D.

Therefore, the specific frequency resources 210 allocated to Cell A are all available to MS a at the boundary of Cell A and the specific frequency resources 220 allocated to Cell B are all available to MS b at the boundary of Cell B. Similarly, the specific frequency resources 210 allocated to Cell D are all available to MS d at the boundary of Cell D. Meanwhile, MS c1 and MS c2 are located at the boundary of Cell C. Thus parts 331 and 332 of the specific frequency resources allocated to Cell C are available to MS c1 and MS c2, respectively.

As described above, total frequency resources allocated to each cell may be divided into one or more frequency resource groups for edge users (e.g. an FFR ratio of 1/3) and a frequency resource group for inner users (e.g. a frequency reuse ratio of 1). Edge users (edge terminals) may be serviced by FFR in various manners depending on how the total frequency resources allocated to the cell are divided. Accordingly, only if each cell has knowledge of how the total frequency resources are divided, through cooperation, interference between cell-edge users can be avoided and thus FFR efficiency can be improved.

Figure 3:
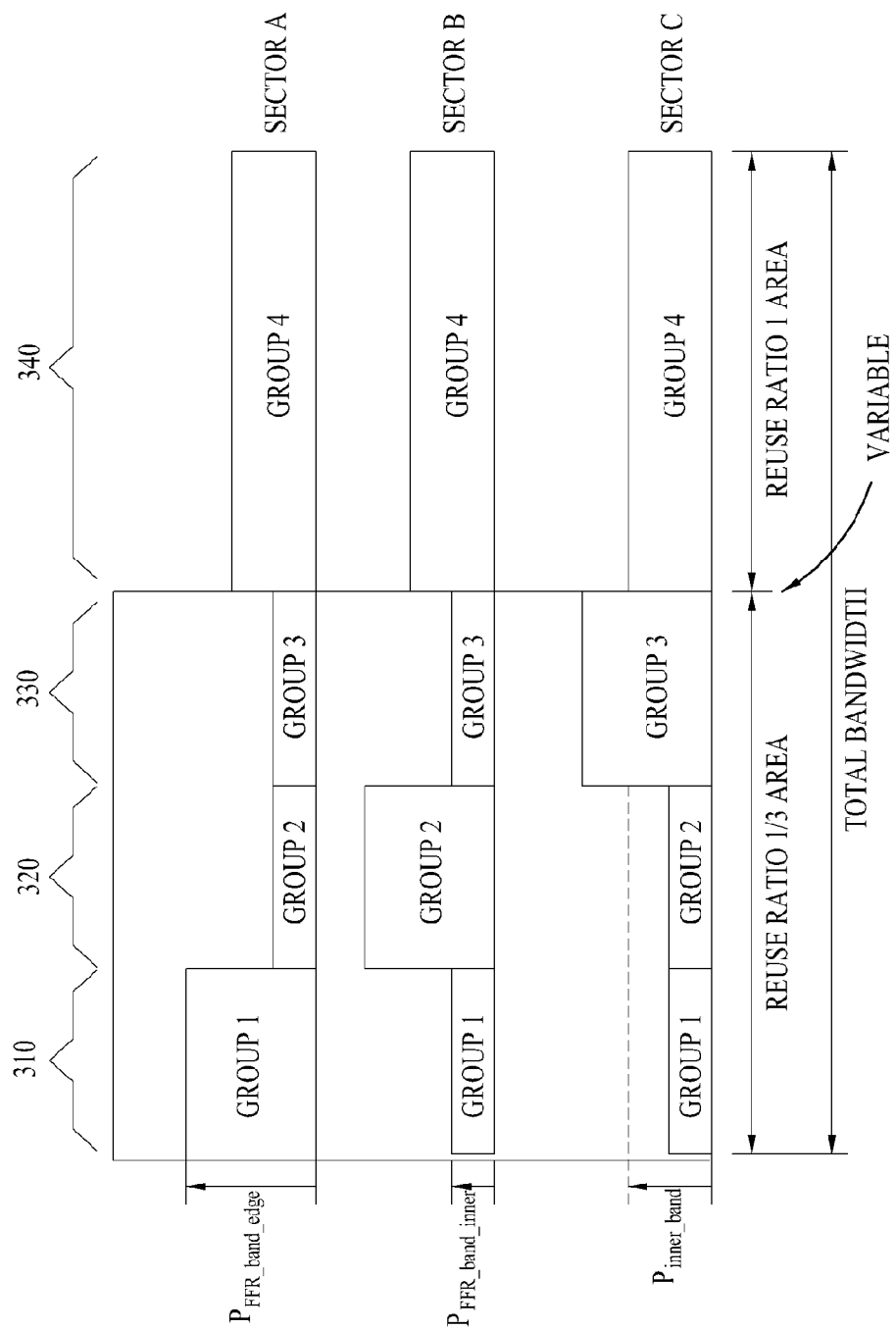
FIG. 3 illustrates an exemplary frequency resource allocation in soft FFR.

FIG. 3 illustrates an exemplary Soft FFR configuration to which an embodiment of the present invention is applicable.

Referring to FIG. 3, total frequency resources allocated to each sector are divided into four frequency resource groups 310 to 340 (Group 1 to Group 4). Group 1, Group 2 and Group 3 are frequency resources for edge terminals, corresponding to the frequency resource groups 210, 220 and 230 of FIG. 2. Group 4 is a frequency resource group for terminals within each sector, corresponding to the frequency resource group 240 of FIG. 2. In FIG. 3, Sector A, Sector B and Sector C correspond to Cell A, Cell B and Cell C of FIG. 2, respectively. Herein, the terms cell and sector each signify a basic network element that implements FFR and thus are interchangeably used in the sense that they service edge users (edge terminals) by FFR.

As stated before, the exemplary Soft FFR configuration illustrated in FIG. 3 is basically similar to the exemplary Hard FFR configuration illustrated in FIG. 2, except that the Soft FFR compensates for a decrease in bandwidth efficiency caused by the unused frequency resource groups (e.g. the frequency resource groups 220 and 230 in Cell A of FIG. 2) in the Hard FFR. Regarding Sector A, for example, a total frequency band available to Sector A is divided into four frequency resource groups. In FIG. 3, Group 1, Group 2 and Group 3 are used for edge terminals, with a frequency reuse ratio of 1/3. Therefore, Sector A provides a service to edge terminals using only one 310 of Group 1, Group 2 and Group 3, FFR_band_edge, while Sector A does not use the other two frequency resource groups 320 and 330, FFR_band_inner for the edge terminals. In contrast, Group 4 is a frequency resource group, inner_band allocated to terminals within Sector A, with a frequency reuse ratio of 1.

Compared to the Hard FFR illustrated in FIG. 2, Sector A services its inner terminals, additionally using FFR_band_inner corresponding to Group 2 and Group 3 in FIG. 3. For this purpose, Sector A sets a low power level for the frequency resources of Group 2 and Group 3, thus preventing interference with edge terminals of Sector B and Sector C. That is, the Soft FFR increases frequency efficiency by grouping frequency resources and applying a different power level to each group according to the usage of the group.

In FIG. 3, three power levels ($P_{FFR\_band\_edge} \geq P_{inner\_band} > P_{FFR\_band\_inner}$) are defined according to the usages of the frequency resource groups, for serving terminals. $P_{FFR\_band\_edge}$ is used when terminals at a sector edge are serviced using the frequency resource group FFR_band_edge with a frequency reuse ratio of 1/3. $P_{FFR\_band\_inner}$ applies to terminals within a sector are serviced using the frequency resource group FFR_band_inner with a frequency reuse ratio of 1/3. $P_{inner\_band}$ is used when inner terminals are serviced using the frequency resource group inner_band with a frequency reuse ratio of 1.

Therefore, for effective implementation of the Soft FFR, a power level should be set for each frequency resource group and a BS and/or a terminal should know the power levels.

In addition, an adaptive FFR method that flexibly controls the bandwidth or configuration ratio of each frequency resource group allocated for FFR may be considered in order to efficiently implement FFR according to the user distribution of a cell (or sector). For this purpose, each BS and/or terminal should know information associated with the bandwidth or the configuration ratio of each frequency resource group.

Configuration of Control Information for Effective FFR Implementation

As stated before, for efficient FFR implementation, a BS and/or a terminal should know information needed for applying FFR. For this purpose, an embodiment of the present invention provides a method for configuring information needed for applying FFR in a preset data format. The control information of the preset data format may indicate at least one frequency resource group for applying FFR and the power level of the at least one frequency resource group.

Frequency resource groups have already been described with reference to FIG. 1.

A power level may be set independently for each frequency resource group. Alternatively, a power level may be set for each frequency resource group according to the usage of the frequency resource group. The latter case will be described as an example, using $P_{FFR\_band\_edge}$, $P_{FFR\_band\_inner}$, and $P_{inner\_band}$. In Hard FFR, $P_{FFR\_band\_inner}$ may be set to 0 and, and $P_{FFR\_band\_edge}$ may be set to be equal to or larger than $P_{inner\_band}$. The power levels of the frequency resource groups may be set so that $P_{FFR\_band\_edge} \geq P_{inner\_band} \geq P_{FFR\_band\_inner}$ in Soft FFR.

Even within the same frequency resource group, different power levels may be set for terminals using the frequency resources, taking into account the channel states of the terminals, the distances to a BS, etc. For instance, when the frequency resource group has one or more basic frequency resources, different power levels may be set for the respective basic frequency resources. To simplify system operations, the power level of each resource of the frequency resource group may be preset or indicated preliminarily to a BS and/or a terminal. In this case, the control information may not contain information about power levels.

In addition, the control information may indicate the number of frequency resource groups. The number of frequency resource groups may be, but is not limited to, 1, 3, 4 or 7. If there is a single frequency resource group, this means that FFR does not apply (Non-FFR). If three frequency resource groups exist, this implies that total frequency resources allocated to a cell are all used for FFR. If the number of frequency resource groups is 4, this means that one frequency resource group is used for inner terminals (a frequency reuse ratio of 1) and the other three frequency resource groups are used for FFR (an FFR ratio of 1/3 or 2/3). If seven frequency resource groups are given, this means that one frequency resource group is used for inner terminals (a frequency reuse ratio of 1), three frequency resource groups are used for a first FFR method (an FFR ratio of 1/3 or 2/3), and the other three frequency resource groups are used for a second FFR method (an FFR ratio of 1/3 or 2/3).

Once the number of frequency resource groups is given, frequency resource groups for edge terminals and a frequency resource group for inner terminals may be arranged in an ascending or descending order of frequency reuse ratios. For instance, given four frequency resource groups, the order of the frequency resource groups in the frequency domain may be determined to be [1/3, 1/3, 1/3, 1], [2/3, 2/3, 2/3, 1] or [1, 2/3, 2/3, 2/3] according to their frequency reuse ratios. If seven frequency resource groups are used and two FFR methods are applied, the order of the frequency resource groups may be [1/3, 1/3, 1/3, 2/3, 2/3, 2/3, 1] according to their frequency reuse ratios. The order of the frequency resource groups may be reversely determined.

The frequency resource group may include at least one basic frequency resource. The basic frequency resource may be a resource block, a CQI (Channel Quality Indicator) configuration unit, or a CSI (Channel Status Information) configuration unit. For example, the number of resource blocks allocated to a specific cell may be 48. In this case, the number of frequency resource groups may be 1 to 48.

The control information may also indicate information about an FFR ratio. Herein, the FFR ratio may be interchangeably used with an FFR method. If three frequency resource groups are used for edge users, the control information may indicate an FFR ratio of 1, 1/3 or 2/3. If six frequency resources groups are used for edge users, the control information may indicate two FFR methods (i.e. FFR ratios). The two FFR methods may be a combination of FFR ratios independently selected from 1, 1/3 and 2/3. For instance, the control information may indicate FFR ratios of 1/3 and 1/3, 1/3 and 2/3, 2/3 and 1/3, etc. as two FFR methods (FFR ratios).

In addition, the control information may indicate the bandwidths of the frequency resource groups. That is, the bandwidth of each frequency resource group associated with FFR may be independently changed by the network. For example, a serving BS may make the bandwidth of each frequency resource group wide or narrow based on feedback information received from terminals. The serving BS may also transmit the feedback information, for example, to an RNC of the network, and the RNC of the network may indicate a new bandwidth for each frequency resource group for the serving BS and a cooperative BS, taking into account a plurality of BSs that perform a multi-cellular MIMO operation. For example, if a relatively large number of terminals are located at the boundary of a specific cell, it is possible to set a wide bandwidth for a frequency resource group used by the specific cell. To simplify system operations, the same bandwidth may be set for all frequency resource groups. In addition, the same bandwidth may be set for the frequency resources groups (310 to 330 in FIG. 3) allocated to edge terminals. If the bandwidths of the frequency resource groups are fixed, the control information may not include information about the bandwidths of the frequency resource groups. The bandwidths may be indicated based on the above-described basic frequency resources.

The bandwidths of the frequency resource groups may be indicated using the ratio of the frequency resource groups (the configuration ratio of the groups). For instance, if four frequency resources groups are used, the bandwidth ratio of the frequency resource groups may be set to 1:1:1:3. If the number of basic frequency resources in total frequency resources allocated to a cell is $N_{RB}$, the bandwidth ratio may be '1+p: 1+q:1+r:$N_{RB}$−p−q−r" where each of p, q and r is an independent integer equal to or larger than 0. When frequency resources groups are to be used for the purpose of applying FFR, the configuration ratio of the groups may be determined according to frequency reuse ratios in FFR. For example, if frequency reuse ratios 1/3 and 1 are simultaneously applied and a plurality of frequency resource groups forming an FFR area for edge users (i.e. an area with a frequency reuse ratio below 1) have the same configuration ratio, the configuration ratio may be expressed as the ratio between the area with a frequency reuse ratio below 1 for edge users (i.e. the FFR area) and an area with a frequency reuse ratio of 1 for inner users, rather than as the configuration ratios of the individual frequency resource groups. That is, the bandwidth ratio may be '1+n:1+n:1+n:$N_{RB}$−3n' where n is 0 or a larger integer. n may be multiplied independently by an arbitrary weight. $N_{RB}$ may be set to various values depending on systems. For example, $N_{RB}$ may be 48.

Let the total number of basic frequency resources be denoted by $N_{RB}$, the number of areas in which FFR is applied to $N_{RB}$ be denoted by $N_{FFR}$, and the reuse ratio of each FFR area be denoted by $m_j/M_j$ (j∈{1, 2, 3, . . . , $N_{FFR}$}). Then, the configuration ratio between the FFR areas for edge users and an area for inner users may be generalized to the following.

$$M_1(1+n_1):M_2(1+n_2):\ldots:M_i(1+n_i)M_{N_{FFR}}(1+n_{N_{FFR}}): N_{RB}-M_1(1+n_1)-M_2(1+n_2)\ldots-M_i(1+n_i)\ldots-M_{N_{FFR}}(1+n_{N_{FFR}})$$

Here, $M_j$ is an integer equal to or larger than 1, $m_j$ is a positive integer equal to or less than $M_j$, and $n_i$ is an integer equal to or larger than 0. Therefore, the configuration ratio of the frequency resource groups may be expressed using $n_1$, $n_2$, . . . , $n_{NFFR}$ and may be indicated by means of a combination of these values. Depending on system requirements, only a part of combinations of the values may be used.

For instance, if the total number of basic frequency resources is $N_{RB}$, three FFR areas exist in the $N_{RB}$ basic frequency resources, and the reuse ratios of the FFR areas are 1/3, 2/3 and 2/5, respectively, the configuration ratio of the three FFR areas for edge users and an area for inner users may be expressed as follows.

$$3\times(1+n_1):3\times(1+n_2):5\times(1+n_3):N_{RB}-3\times(1+n_1)-3\times(1+n_2)-5\times(1+n_3)$$

Here, $n_1$, $n_2$ and $n_3$ are integers equal to or larger than 0.

For instance, if the total number of basic frequency resources is $N_{RB}$, one FFR area exists in the $N_{RB}$ basic frequency resources, and the reuse ratio of the FFR area is 1/3 or 2/3, the configuration ratio of the FFR area for edge users and an area for inner users may be expressed as follows.

$$3\times(1+n):N_{RB}-3\times(1+n)$$

Here, n is an integer equal to or larger than 0.

The control information may further include information about the type of a cell or sector to which FFR is applied. As described before, a cell or sector is a basic unit using FFR. These terms are interchangeable from the viewpoint of applying FFR. The type of a cell (sector) to which FFR is applied tells what frequency resource group is available for edge users in the cell (sector). For instance, referring to FIG. 2, the three frequency resource groups 210, 220 and 230 are used for edge users and thus three cell types may be defined depending on a frequency resource group that a cell uses among the three frequency resource groups. In FIG. 2, because Cell A, Cell B and Cell C use different frequency resource groups, they have different cell types to which FFR is applied. On the other hand, Cell A and Cell D use the same frequency resource group, they are of the same cell type to which FFR is applied. To simplify system operations, cell types to which FFR is applied may be indicated preliminarily or preset for specific cells and terminals within the specific cells. In this case, the control information may not include information about a cell type to which FFR is applied.

The control information of the preset data format associated with application of FFR should be signaled between a serving BS and a terminal or between the serving BS and a neighbor BS. For example, the serving BS may transmit the control information of the preset data format to the terminal periodically or upon generation of an event. The control information may be transmitted to a plurality of terminals on a one-to-multipoint channel. For instance, the one-to-multipoint channel may be a BCH (broadcast channel). The control information may be configured to be cell-specific or group-specific. The event may occur when the environment of a cell or sector to which FFR is applied satisfies a predetermined condition. The predetermined condition may be related to, for example, the number of terminals at the boundary of the cell or sector, the locations of terminals, the channel states of terminals, etc. Terminals to which FFR is applied may perform channel estimation using information (e.g. the power levels of frequency resource groups, etc.) acquired from the control information using the preset data format. The terminals may transmit feedback information associated with application of FF to the serving BS. The feedback information may be transmitted on an uplink channel configured for FFR. The serving BS may transmit the feedback information to an RNC (radio network controller) of the network. In this case, the RNC of the network may determine whether to update/change settings associated with FFR application, configure information about the determination in control information of the preset data format, and transmit the control information to the serving BS and the neighbor BS.

Configuration of Control Information Associated with FFR in Bitmap

A method for configuring information needed to apply FFR in the form of a bitmap according to an embodiment of the present invention will be described hereinbelow. For the sake of convenience, it is assumed that a total frequency band allocated to a specific cell includes 10 basic frequency resources and is divided into four frequency resource groups. In this case, the frequency resource groups are the same as illustrated in FIG. 2 or 3. For the sake of convenience, the following description is given in the context of the frequency resource groups of Sector A in FIG. 3.

The position of each bit/bit stream in the bitmap may correspond to a basic frequency resource of the frequency resource groups. A basic frequency resource may be a resource block, a CQI configuration unit or a CSI configuration unit. The value of a bit/bit stream may indicate the frequency resource group of a basic frequency resource corresponding to the bit/bit stream or the FFR-related usage of the basic frequency resource. For example, if four frequency resource groups (310 to 340 of FIG. 3) are indicated by '1' to '4', respectively, control information may be configured in the following bitmap.

[1, 2, 3, 4, 4, 4, 4, 4, 4, 4]

If 'FFR_band_edge' (310 in FIG. 3), 'FFR_band_inner' (320 and 330 in FIG. 3), and 'inner band' (340 in FIG. 3) are indicated by '1', '2', and '3', respectively according to the usages of the frequency resource groups (e.g. usages based on power levels), the bitmap of the control information may be given as

[1, 2, 2, 3, 3, 3, 3, 3, 3, 3]

The values '1' to '3' are expressed as appropriate binary codewords, taking into account data transmission efficiency. For example, '1' to '3' may be expressed as '00', '01' and '10', respectively.

When FFR ratios (i.e. FFR methods) are preset between a BS and terminals and frequency resource groups allocated to cell-edge terminals have the same configuration ratio, the bitmap may be simplified. For example, the bitmap of the control information may be given as

[0, 0, 0, 0, 0, 0, 1, 1, 1, 1]

'0' represents total frequency groups allocated to cell-edge terminals and '1' represents a frequency group allocated to inner terminals. Because the frequency groups allocated to the cell-edge terminals have the same configuration ratio, six basic frequency resources indicated by '0' form three frequency groups each having two basic frequency resources. Therefore, two out of the six basic frequency resources are used for 'FFR_band_edge' (310 in FIG. 3) and the other of the six basic frequency resources are used for 'FFR_band_inner' (320 and 330 in FIG. 3). The order of 'FFR_band_edge' and 'FFR_band_inner' may be indicated according to internal settings.

As another embodiment of the present invention, the control information may be configured in the form of a bitmap having each bit/bit stream indicating the power level of a frequency resource group. In this case, the position of each bit/bit stream corresponds to a basic frequency resource and the value of the bit/bit stream indicates the power level of the basic frequency resource.

Let the power levels of the basic frequency resources be denoted by $P_0$ to $P_9$. Then the control information may be configured to be the following bitmap.

[$P_0, P_1, P_2, P_3, P_4, P_5, P_6, P_0, P_8, P_9$]

When the basic frequency resources of the same frequency resource group have the same power level, the control information may be configured as follows.

[$P_0, P_1, P_2, P_3, P_3, P_3, P_3, P_3, P_3, P_3$]

If power levels are set for the basic frequency resources according to the usages of the frequency resource groups, the power levels may be notified on a usage basis. That is, if the power levels are $P_{FFR\_band\_edge}$, $P_{FFR\_band\_inner}$, and $P_{inner\ band}$ according to the usages of the frequency resource groups, the control information may be configured as follows.

[$P_{FFR\_band\_edge}$, $P_{FFR\_band\_inner}$, $P_{FFR\_band\_inner}$, $P_{inner\ band}$, $P_{inner\ band}$, $P_{inner\ band}$, $P_{inner\ band}$, $P_{inner\ band}$, $P_{inner\ band}$, $P_{inner\ band}$]

The power levels may be preset between a BS and terminals or preliminarily indicated to the BS and the terminals. In this case, each bit/bit stream of the control information may indicate the index of a power level.

In addition, if the power level of each frequency resource group (or each basic frequency resource of the group) is preset between the BS and the terminals or preliminarily indicated to the BS and the terminals, the bitmap-type control information may not be transmitted separately. That is, the bitmap-type control information may indicate only the frequency resource group or usage of each basic frequency resource and thus the preset power levels may be used. For example, control information is configured as the following bitmap

[1, 2, 2, 3, 3, 3, 3, 3, 3, 3]

Then the control information indicates that a basic frequency resource corresponding to each bit/bit stream of the bitmap is used as 'FFR_band_edge' (310 in FIG. 3), 'FFR_inner_band (320 and 330 in FIG. 3), or 'inner band' (340 in FIG. 3). In this case, the BS or a terminal determines the power level of each basic frequency resource corresponding to each bit/bit stream in the bitmap to be

[$P_{FFR\_band\_edge}$, $P_{FFR\_band\_inner}$, $P_{FFR\_band\_inner}$, $P_{inner\ band}$, $P_{inner\ band}$, $P_{inner\ band}$, $P_{inner\ band}$, $P_{inner\ band}$, $P_{inner\ band}$, $P_{inner\ band}$]

In this case, $P_{FFR\_band\_inner}$, $P_{FFR\_band\_inner}$ and $P_{inner\ band}$ are preset between the BS and the terminals and thus not signaled separately.

In a further embodiment of the present invention, the control information may be configured to be a bitmap in which a bit/bit stream indicating a specific frequency resource group (or usage) alternates with a bit/bit stream indicating the power level of the frequency resource group (or usage). This embodiment is the same as the foregoing embodiments except that bits/bit streams indicating frequency resource groups (or usages) together with bits/bit streams indicating the power levels of frequency resource groups (or usages) form a bitmap.

The control information may further include a header indicating a bitmap configuration. To match the bitmap-type control information to a predetermined size, a padding may be included in the control information. The number of bits/bit streams indicating control information associated with FFR implementation may be a multiple of 2, 4 or 8 in order to process data in units of 8 bits.

Configuration of Control Information Associated with FFR in Message

A method for configuring control information associated with FFR in the form of a message according to embodiments of the present invention will be described below with reference to FIGS. 4 and 5. Control information taking the form of a message offers less freedom but uses a smaller number of bits for transmission than control information taking the form of a bitmap.

FIG. 4 illustrates exemplary control information associated with FFR in the form of a message. Referring to FIG. 4, the message-type control information includes a Group count field 410, a Power level field 420, a Sector type field 430, a Configuration ratio of groups field 440, an FFR method 1 field 451, and an FFR method 2 field 452. The message may further include a message type, a header indicating information about each field, and a padding used to adjust the size of the message. All fields related to an embodiment of the present invention are included in the message for FFR, by way of example. Thus it is to be understood that all of the fields are not necessarily included in the message. Whether to include a specific field depends on system settings for FFR. For example, if the value of a specific field is preset between a BS and terminals or preliminarily indicated to the BS and the terminals, the message-type control information may not include the specific field. The order of the fields illustrated in FIG. 4 may be changed in various manners. In addition, each field included in the message-type control information may be configured in units of a multiple of 2, 4 or 8 bits in order to process data in units of 8 bits.

FFR-associated control information may be approached in various manners according to the number of frequency resource groups into which total resources are divided, which has already been described and thus will not described again. Instead, configuring control information in the form of a message will be described, taking a specific example.

For instance, if FFR is configured as illustrated in FIG. 3, the number of frequency resource groups is 4, an FFR ratio is 1/3 (FFR 1/3), three sector types A, B and C are defined, and power levels are given as $P_{FFR\_band\_edge}$, $P_{FFR\_band\_inner}$ and $P_{inner\_band}$. In this case, the control information message has the following fields and their descriptions in Table 1 below.

TABLE 1

| Field | Description |
| --- | --- |
| Group count | 4 |
| Power level | $P_{FFR\_band\_edge}$, $P_{FFR\_band\_inner}$ and $P_{inner\_band}$ |
| Sector type | A |
| Configuration ratio of groups | 1:1:1:3 |
| FFR ratio 1 | 1/3 |

If there are a plurality of preset power level sets between the BS and the terminals, the control information may be an index indicating a specific power level set.

In the above example, the configuration ratios of frequency resource groups for edge terminals are individually indicated as 1:1:1. If the frequency resource groups for edge terminals have the same configuration ratio, the group configuration ratio may be indicated as the configuration ratio between the frequency resource groups for edge terminals and the frequency resource group for inner terminals. For instance, the configuration ratio may be simply indicated as 1:1 in the above example.

If the system presets some information for FFR application, the number of transmission bits in the message may be efficiently reduced.

Table 2 illustrates an exemplary message configuration of control information associated with FFR, when up to seven frequency resource groups can be used in the system. The example of Table 2 may be realized using the data format of FIG. 4.

TABLE 2

| Syntax | Size (bit) | Description |
| --- | --- | --- |
| Group count | 2 bits | 00 (1), 01 (3), 10 (4), 11 (7) |
| If (Group count !=00){ | — | — |
| $P_{FFR\_band\_edge}$, | 3 bits | [dB] |
| $P_{FFR\_inner\_band}$, | 3 bits | |
| $P_{inner\_band}$ | 3 bits | |
| If (Group count !=01){ | — | — |
| FFR method | 2 bits | 01 (Non-FFR), 01 (FFR 1/3), 10 (FFR 2/3) |
| Sector type | 2 bits | 00 (Type A), 01 (Type B), 10 (Type C), 11 (reserved) |
| }else if (Group count=10){ | — | — |
| FFR method | 2 bits | 01 (Non-FFR), 01 (FFR 1/3), 10 (FFR 2/3) |
| Sector type | 2 bits | 00 (Type A), 01 (Type B), 10 (Type C), 11 (reserved) |
| Configuration ratio of groups | 2 bits | 00 (1:1), 01 (1:2), 10 (1:3), 11 (1:4) |
| }else if(Group count=11){ | — | — |
| FFR method 1 | 2 bits | 01 (Non-FFR), 01 (FFR 1/3), 10 (FFR 2/3), 11 (reserved) |
| FFR method 2 | 2 bits | 01 (Non-FFR), 01 (FFR 1/3), 10 (FFR 2/3) |
| Sector type | 2 bits | 00 (Type A), 01 (Type B), 10 (Type C), 11 (reserved) |
| Configuration ratio of groups | 2 bits | 00 (1:1:1), 01 (1:1:2), 10 (1:1:3), 11 (1:2:3) |
| } | — | — |
| } | — | — |

In Table 2, if there is one frequency resource group, this means that FFR is not used (Non-FFR). If the number of frequency resource groups is 3, this means that FFR applies to all frequency bands allocated to a cell. In case of four frequency resource groups, it implies that one frequency resource group is allocated to inner terminals and three frequency resource groups are allocated to edge terminals, as illustrated in FIG. 2 or 3. If there are seven frequency resource groups, this means that one frequency resource group is allocated to inner terminals and six frequency resource groups are allocated to edge terminals. Two FFR methods may be used for the six frequency resource groups.

In Table 2, the configuration ratio of groups is the ratio between the entire frequency resource groups for edge terminals and the frequency resource group for inner terminals, on the assumption that the frequency resource groups for the edge terminals have the same bandwidth. Therefore, if FFR applies to total frequency bands allocated to a cell (i.e. Group count='01; (three groups)), configuration information taking the form of a message may not include information about the configuration ratio of groups. In this case, the configuration ratio of the frequency resource groups is 1:1:1. If Group count is '10' (i.e. four groups), the configuration ratios of groups, 1:1, 1:2, 1:3 and 1:4 are equivalent to the configuration ratios of all frequency resource groups, 1:1:1:3, 1:1:1:6, 1:1:1:9, and 1:1:1:12. If Group count is '11' (i.e. seven groups), the configuration ratios of groups, 1:1:1, 1:1:2, 1:1:3 and 1:2:3 are equivalent to the configuration ratios of all frequency resource groups, 1:1:1:1:1:1:3, 1:1:1:1:1:1:6, 1:1:1:1:1:1:9, and 1:1:1:2:2:2:9.

Unlike the example of Table 2, the bandwidths of the frequency resource groups allocated to edge terminals may be changed independently according to system settings. In this case, information about the configuration ratio of groups included in the message-type control information should indicate the respective configuration ratios of all frequency resource groups.

In another embodiment of the present invention, if the number of frequency resource groups is fixed to a specific value, this obviates the need for a bit area that indicates the number of frequency resource groups in Table 2 and FIG. 4. For instance, the number of frequency resource groups may be fixed to 4 or 7 according to system settings.

Table 3 illustrates an exemplary message configuration of control information associated with FFR, when the number of frequency resource groups is fixed. Referring to FIG. 5, the message-type control information includes a Power level field 520, a Sector type field 530, a Configuration ratio of groups field 540, and an FFR method field 550. The message may further include a message type, a header indicating information about each field, and a padding used to adjust the size of the message. As described before, all fields related to an embodiment of the present invention are included in the message for FFR, by way of example. Thus it is to be understood that all of the fields are not necessarily included in the message. FIG. 5 is the same as FIG. 4 except that the field indicating the number of frequency resource groups is omitted. In addition, each field included in the message-type control information may be configured in units of a multiple of 2, 4 or 8 bits.

For instance, the number of frequency resource groups may be limited to 4, as illustrated in FIG. 2 or 3. Table 3 illustrates an exemplary message configuration of control information associated with FFR, for four frequency resource groups. The contents of Table 3 are identical to those of Table 2 except that the number of groups is limited to 4. Similarly to Table 2, the configuration ratio of groups is expressed as the ratio between entire frequency resource groups allocated for edge terminals (a frequency reuse ratio of 1/3) and a frequency resource group allocated for inner terminals (a frequency reuse ratio of 1).

TABLE 3

| Syntax | Size (bit) | Description |
| --- | --- | --- |
| FFR method | 2 bits | 01 (Non-FFR), 01 (FFR 1/3), 10 (FFR 2/3), 11 (reserved) |
| If (FFR method !=00){ | — | — |
| $P_{FFR\_band\_edge}$, | 3 bits | [dB] |
| $P_{FFR\_inner\_band}$, | 3 bits | |
| $P_{inner\_band}$ | 3 bits | |
| Sector type | 2 bits | 00 (Type A), 01 (Type B), 10 (Type C), 11 (reserved) |
| Configuration ratio of groups | 2 bits (or) 4 bits | 00 (1:1), 01 (1:2), 10 (1:3), 11 (1:4), (or) 0 to 15 |
| } | — | — |

If frequency resource groups with FFR 1/3 have the same configuration ratio, the configuration ratio of groups may be expressed as the following in Table 3.

$$3\times(1+n):N_{NB}-3\times(1+n)$$

Here, $N_{NB}$ denotes the total number of basic frequency resources and n is an integer equal to or larger than 0.

On the assumption that an OFDMA system has 48 resource blocks and uses four frequency resource groups, the configuration ratio of the frequency resource groups may be determined to be '3(1+n):48−3(n+1)'. Here, n is an integer ranging from 0 to 15. In this case, four bits are required to represent the configuration ratio of the frequency resource groups. For example, if n=2, the configuration ratio between groups with a frequency reuse ratio of 1/3 and a group with a frequency reuse ratio of 1 is 3:13, that is, the configuration ratio of the respective frequency resource groups is 3:3:3:39. To reduce the number of bits needed to represent the configuration ratio of frequency resource groups, only a part of the n value in '3(1+n):48−3(n+1)' may be used. In this case, the part of the n value may be combined in various manners according to system requirements. While only Table 3 illustrates an example of determining the configuration ratio of frequency resource groups using the proportional expression, this may be applied to Table 2 and FIGS. 4 and 5 in the same/a similar manner.

The embodiments of the present invention described above are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a terminal. Herein, the term BS refers to a terminal node of a network, which communicates directly with the terminal. In some cases, a specific operation described as performed by the BS may be performed by an upper node of the BS. Namely, it is apparent that, in a network comprised of a plurality of network nodes including a BS, various operations performed for communication with a terminal may be performed by the BS, or network nodes other than the BS. The term 'BS' may be replaced with the term fixed station, Node B, eNode B (eNB), 'access point', etc. The term 'terminal' may be replaced with the term UE (User Equipment), MS (Mobile Station), MSS (Mobile Subscriber Station), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. that performs the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a mobile communication system and, more particularly, to a method for providing control information for FFR in a multi-cellular structure.

The invention claimed is:

1. A method for transmitting control information by a network in a mobile communication system supporting FFR (fractional frequency reuse), the method comprising:
generating a message including control information indicating:
the number of frequency resource groups to which FFR is applied, bandwidth sizes of the frequency resource groups, and a bandwidth ratio between the frequency resource groups,
that the frequency resource groups comprise a reuse-1 frequency resource group and a plurality of reuse-3 frequency resource groups including a first reuse-3 frequency resource group, a second reuse-3 frequency resource group, and a third reuse-3 frequency resource group,
that a transmission power level for the first reuse-3 frequency resource group is higher than a transmission power level for the reuse-1 frequency resource group, and the transmission power level for the reuse-1 frequency resource group is higher than transmission power levels for the second and third reuse-3 frequency resource groups,
that the plurality of reuse-3 frequency resource groups have a same bandwidth size, and
that the bandwidth ratio between the plurality of reuse-3 frequency resource groups and the reuse-1 frequency resource group includes 1:1:1:3;

transmitting the message to at least one terminal;
receiving feedback information for a FFR operation according to the control information via a FFR-dedicated control channel from the at least one terminal, wherein the feedback information is generated by performing channel estimation at the at least one terminal based on transmission power levels and frequency bandwidths of a FFR configuration indicated by the control information; and
updating the FFR configuration based on the feedback information.

2. The method according to claim 1, wherein the control information further indicates a sector type to which FFR is applied.

3. The method according to claim 1, wherein each of the frequency resource groups includes at least one basic frequency resource and the basic frequency resource is a resource block, a CQI (Channel Quality Indicator) configuration unit, or a CSI (Channel Status Information) configuration unit.

4. The method according to claim 3, wherein the control information is configured in a form of a bitmap and a position of each bit or bit stream in the bitmap corresponds to a basic frequency resource of the frequency resource groups.

5. The method according to claim 4, wherein a value of the bit or bit stream indicates a frequency resource group or usage of the basic frequency resource.

6. The method according to claim 4, wherein a value of the bit or bit stream indicates a transmission power level of the basic frequency resource.

7. The method according to claim 3, wherein the bandwidth ratio between the frequency resource groups includes a ratio between the at least one basic frequency resource included in each of the frequency resource groups.

8. The method of claim 1, wherein updating the FFR configuration includes:
updating the control information according to the received feedback information; and
transmitting the updated control information to the at least one terminal.

9. A method for receiving control information by a terminal in a multi-cellular mobile communication system supporting FFR (fractional frequency reuse), the method comprising:
receiving a message including control information from a network, extracting from the message control information indicating:
the number of frequency resource groups to which FFR is applied, bandwidth sizes of the frequency resource groups, and a bandwidth ratio between the frequency resource groups,
that the frequency resource groups comprise a reuse-1 frequency resource group and a plurality of reuse-3 frequency resource groups including a first reuse-3 frequency resource group, a second reuse-3 frequency resource group, and a third reuse-3 frequency resource group,
that a transmission power level for the first reuse-3 frequency resource group is higher than a transmission power level for the reuse-1 frequency resource group, and the transmission power level for the reuse-1 frequency resource group is higher than transmission power levels for the second and third reuse-3 frequency resource groups,
that the plurality of reuse-3 frequency resource groups have a same bandwidth size, and that the bandwidth ratio between the plurality of reuse-3 frequency resource groups and the reuse-1 frequency resource group includes 1:1:1:3;

generating feedback information by performing channel estimation at the at least one terminal based on transmission power levels and frequency bandwidths of a FFR configuration indicated by the control information; and transmitting the feedback information for a FFR operation according to the control information via a FFR-dedicated control channel to the network, wherein the feedback information is configured to be used by the network to update the FFR configuration.

10. The method according to claim 9, wherein the control information further indicates a sector type to which FFR is applied.

11. The method according to claim 9, wherein each of the frequency resource groups includes at least one basic frequency resource and the basic frequency resource is a resource block, a CQI (Channel Quality Indicator) configuration unit, or a CSI (Channel Status Information) configuration unit.

12. The method according to claim 11, wherein the control information is configured in a form of a bitmap and a position of each bit or bit stream in the bitmap corresponds to a basic frequency resource of the frequency resource groups.

13. The method according to claim 12, wherein a value of the bit or bit stream indicates a frequency resource group or usage of the basic frequency resource.

14. The method according to claim 12, wherein a value of the bit or bit stream indicates a transmission power level of the basic frequency resource.

15. The method according to claim 11, wherein the bandwidth ratio between the frequency resource groups includes a ratio between the at least one basic frequency resource included in each of the frequency resource groups.

16. The method of claim 9, wherein the network updates the control information according to the feedback information, and the method further comprising:

receiving the updated control information from the network.

* * * * *